United States Patent [19]

Nash et al.

[11] 4,312,185
[45] Jan. 26, 1982

[54] LOW PROFILE FUEL INJECTION SYSTEM

[75] Inventors: Dudley O. Nash, Cincinnati; Glenn L. Knight, Jr., Mason, both of Ohio

[73] Assignee: General Electric Company, Cincinnati, Ohio

[21] Appl. No.: 122,622

[22] Filed: Feb. 19, 1980

[51] Int. Cl.³ .............................................. F02K 3/10
[52] U.S. Cl. ........................................ 60/739; 60/261; 60/262
[58] Field of Search ................ 60/739, 261, 262, 224, 60/267, 270 R, 730

[56] References Cited

U.S. PATENT DOCUMENTS

| | | | |
|---|---|---|---|
| 2,690,648 | 10/1954 | Pearce et al. | 60/739 |
| 2,944,388 | 7/1960 | Bayer | 60/261 |
| 2,963,857 | 12/1960 | Egbert et al. | 60/267 |
| 2,988,878 | 6/1961 | Hopper | 60/739 |
| 3,181,297 | 5/1965 | Belk et al. | 60/261 |
| 3,670,501 | 6/1972 | Arand | 60/261 |
| 3,698,186 | 10/1972 | Beane et al. | 60/261 |
| 3,793,838 | 2/1974 | Nash | 60/739 |
| 3,949,775 | 4/1976 | Cornell | 60/739 |

Primary Examiner—Robert E. Garrett
Attorney, Agent, or Firm—Patrick M. Hogan; Derek P. Lawrence

[57] ABSTRACT

A low profile fuel injection system for a thrust augmenter to a gas turbine engine, for example, a turbofan engine, comprising fuel manifolds secured with the outer surface of the augmenter casing and arranged to receive fuel under pressure from a fuel source, fuel-connecting members containing flow channels and secured with the inner surface of the casing, injector valve heads containing fuel metering means and spaced circumferentially on the outer surface of the casing, and injector tubes having spray orifices and extending from the injector valve heads into the flow ducts within the casing. The elements are in communication with each other such that fuel from the fuel source is injected from the injector tubes into the gas flow within the augmenter to achieve additional engine thrust.

18 Claims, 5 Drawing Figures

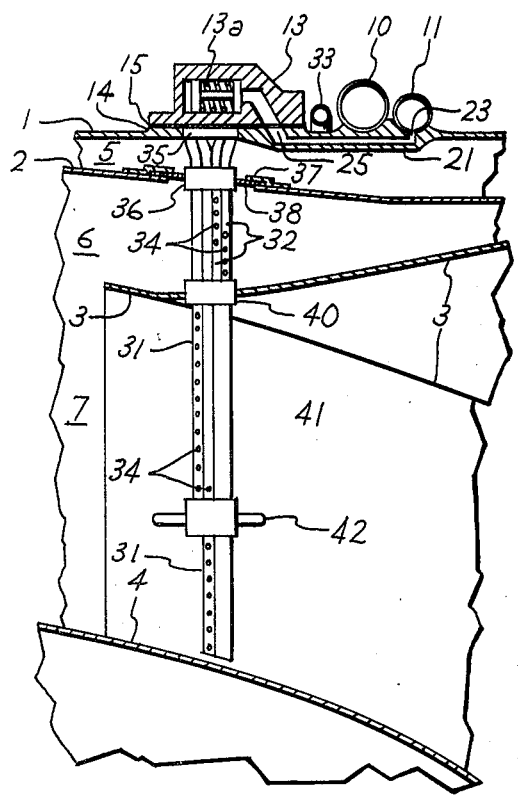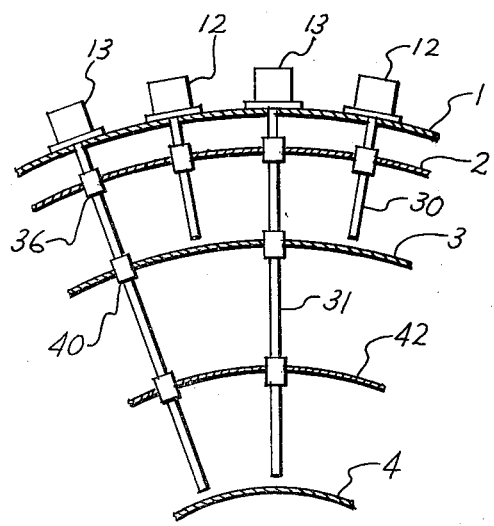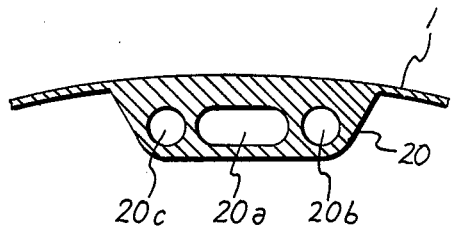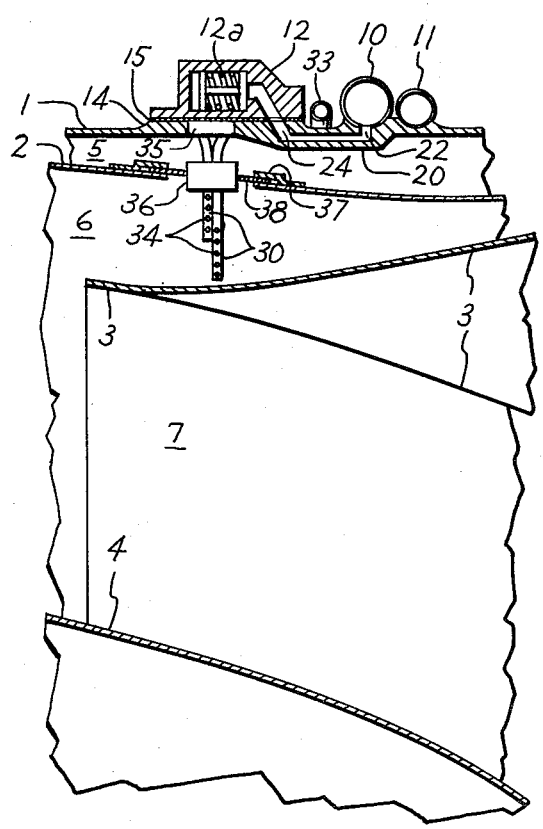

LOW PROFILE FUEL INJECTION SYSTEM

BACKGROUND OF THE INVENTION

1. Field of the Invention

This invention relates to fuel injectors for gas turbine engines, and particularly to a new and improved low profile fuel injection system for injecting fuel into a thrust augmenter of a gas turbine engine.

2. Description of the Prior Art

A thrust augmenter, or afterburner, is added to a gas turbine engine in order to increase the engine thrust. An augmenter typically comprises a casing added to the aft end of the engine with an arrangement of flame holders, fuel injectors, and appropriate fuel manifolds. When augmented thrust is desired, fuel is injected through injector tubes into the gas exiting the turbine section of the engine. The fuel-gas mixture is ignited and the resulting combustion produces additional thrust.

An augmenter can also be utilized on the aft end of a turbofan engine. In such an arrangement, fuel can be injected not only into the gas exiting the turbine, but also into the bypass air exiting the fan duct.

One difficulty which has been encountered with augmenters, however, is their radial size. A high performance aircraft requires a minimum frontal area in order to decrease drag and increase speed and range. Correspondingly, this requires an engine nacelle of minimum frontal area as well. Prior art augmenters, however, include components which extend radially outward to such a distance that the engine nacelle must be enlarged radially to accommodate them. Thus, the desired minimum engine nacelle size is unobtainable. Furthermore, if it is desired to modify an engine already fitted to an aircraft by adding an augmenter to the engine, the modification may be made impractical because of the necessity of increasing the dimensions of the nacelle to accommodate the augmenter.

More specifically, one component of the augmenter having a radial extension contributing to the size problems is the fuel injection system. A typical fuel injection system of an augmenter includes injector tubes, injector valve heads including fuel-metering means and from which the injector tubes extend, fuel manifolds carrying the fuel to the injectors, and connecting conduits which transfer the fuel from the manifolds to the injector valve heads. The injector valve heads, fuel manifolds, and connecting conduits of existing fuel injection systems are mounted on the outer surface of the augmenter casing in such a manner that the portion of the nacelle in which they are located must be significantly enlarged radially relative to other portions of the nacelle.

Another difficulty encountered in prior augmenters is that the augmenter casing often requires ring stiffeners or other stiffening provisions to maintain casing strength and rigidity. Such stiffeners not only add to engine cost and weight, but can also increase the radial dimensions of the augmenter.

Still another problem with prior augmenters involves assembly and maintenance. Most augmenters include multiple injector tubes, valve heads, and connecting conduits spaced around the circumference of the casing. Connections between each component are typically made with bolted flanges or threaded tube fittings. Installation or replacement of a single injector valve head or an injector tube can thus require multiple suboperations involving other components as well. This increases maintenance time and costs.

Another problem arises when fuel conduits in the form of tubes are mounted transversely on the inner surface of the augmenter casing in a stream of air. This can occur, for example, when a cooling duct carrying a portion of the fan bypass air is installed adjacent the inner surface of the augmenter casing to help prevent casing overheating. Although such mounting helps to maintain a minimum radial dimension of the augmenter, the tubes so mounted increase aerodynamic drag.

Another problem encountered with augmenters on turbofan engines is the excessive number of fuel metering valves required to meter fuel to both the fan duct injector tubes and the core duct injector tubes, particularly when there are twice as many fan as core injector tubes. A suitable manner of reducing the number of metering valves required for an augmenter to a turbofan engine is disclosed in U.S. Pat. No. 3,793,838 assigned to the same assignee as the present invention. The present invention utilizes the same concept of a fuel metering valve in each fan injector valve head being used to meter fuel for fan injector tubes extending from both that fan injector valve head and from adjacent core injector valve heads. This is accomplished by means of jumper tubes. The present invention, however, improves that concept in a low profile configuration.

In view of the above-mentioned problems with prior art augmenters, it is, therefore, a primary object of the present invention to provide a new and improved low profile fuel injection system for an augmenter to a gas turbine engine which permits an engine nacelle containing the augmenter to be of minimum frontal area.

Another object of the present invention is to provide a fuel injection system for an augmenter in which the components of the system provide improved structural strength to the augmenter casing and eliminate the need for casing ring stiffeners.

Another object of the present invention is to provide a fuel injection system for an augmenter in which installation or replacement of injector valve heads or injector tubes is accomplished in a simple operation.

Another object of the present invention is to mount the fuel conduits of a fuel injection system in such a manner as to minimize aerodynamic drag.

Still another object of the present invention is to provide a low profile fuel injection system for an augmenter in which fuel metering for the injector tubes is accomplished with a reduced number of fuel metering valves.

SUMMARY OF THE INVENTION

The present invention, in accordance with one embodiment thereof, comprises a low profile fuel injection system for injecting fuel into a thrust augmenter of a gas turbine engine. The injection system comprises at least one fuel manifold secured with the outer surface of the augmenter casing and receiving fuel under pressure from a fuel source, and at least one fuel conduit secured with the inner surface of the augmenter casing, each fuel conduit communicating with the fuel manifold and an injector valve head. Each injector valve head communicates with at least one injector tube which extends into the interior of the casing for injecting fuel into the gas flow therein.

In a particular embodiment of the invention on a turbofan engine, the injection system includes a fan fuel manifold and a core fuel manifold, bonded or otherwise fixedly secured with and extending circumferentially on the outer surface of the augmenter casing, for carrying fuel to the assembly. A plurality of fan injector valve heads and a plurality of core injector valve heads are spaced alternately and circumferentially on the outer surface of the augmenter casing. Each injector valve head is preferably mounted on a mounting pad bonded to the outer surface of the augmenter casing. The valve head includes fuel metering means and communicates with its respective fuel manifold through a flow channel in a connecting member secured with the inner surface of the augmenter casing. Each fan injector valve head communicates metered fuel to at least one fan injector tube extending from it into the fan flow duct of the augmenter for injection and proper distribution of the fuel into the fan gas stream. Each core injector valve head communicates metered fuel to at least one core injector tube extending from it into the core flow duct of the augmenter for injection into the core gas stream. Preferably, at least one fan injector tube also extends from each core injector valve head and receives metered fuel from an adjacent fan injector valve head through a fuel jumper tube. Preferably, each bundle of injector tubes includes fillet radii and bushings to improve structural strength, and the bundles of injector tubes extending from the core injector valve heads can additionally include reinforcing beams and can be interconnected by an annular damper ring.

BRIEF DESCRIPTION OF THE DRAWING

This invention will be better understood from the following description taken in conjunction with the accompanying drawing wherein:

FIG. 1 is a side view of a section of the upper half of a gas turbine engine showing a low profile fuel injection system including the core injector valve head and a bundle of core and fan injector tubes extending from it, according to the present invention.

FIG. 2 is a side view of a fan injector valve head and a bundle of fan injector tubes extending from it.

FIG. 4 is an enlarged cross-sectional view of a fan fuel connecting member taken along line 4—4 of FIG. 3.

FIG. 5 is a partially diagrammatic front view of the injector valve heads and the bundles of injector tubes and including an annular damper ring.

DESCRIPTION OF THE PREFERRED EMBODIMENT

Figure 3:
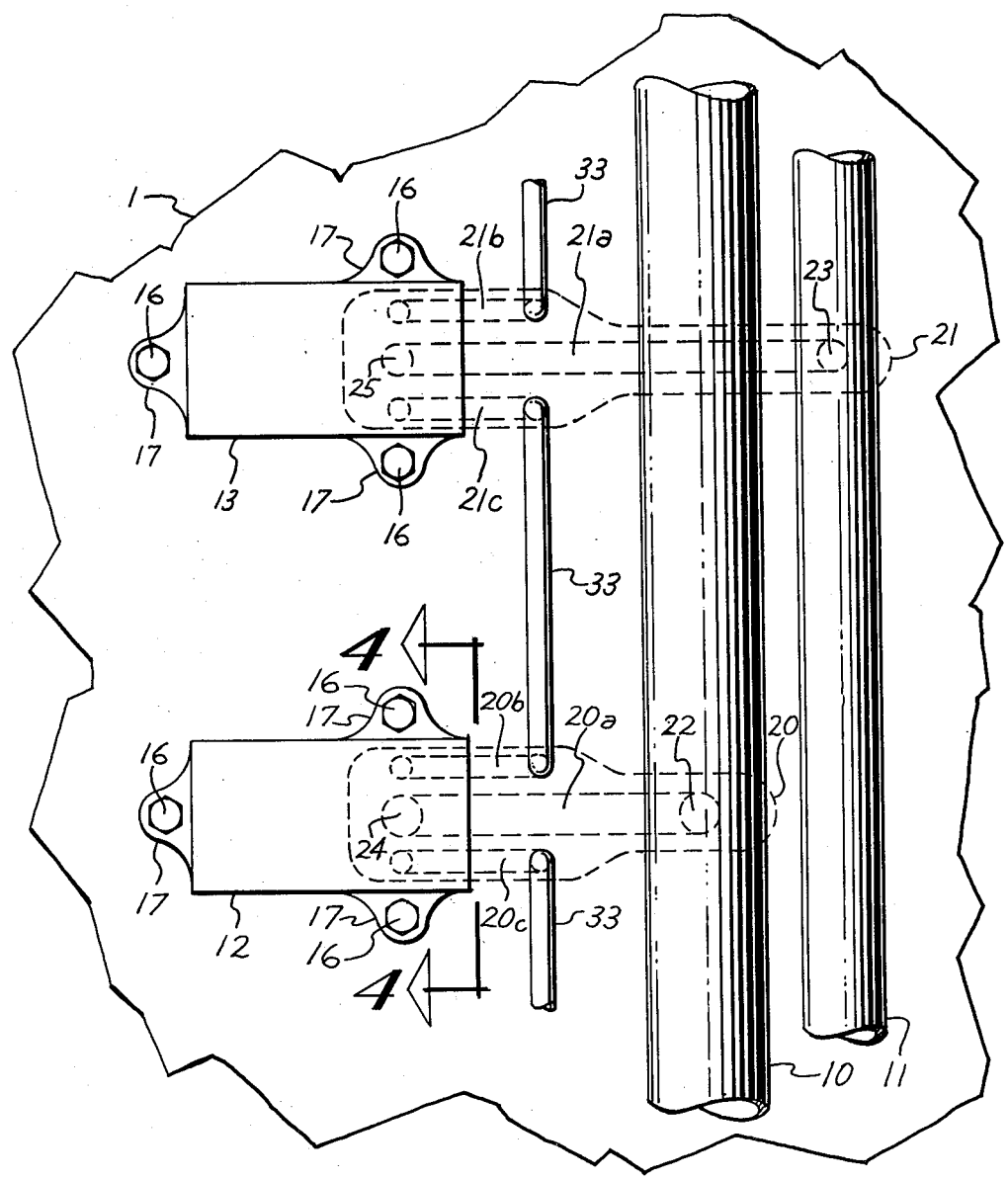
FIG. 3 is a top view of the injector valve heads and fuel manifolds.

Turning now to a consideration of the drawing, and in particular to FIGS. 1 and 2, there is shown a low profile fuel injection system for use in an augmenter combustion system for a turbofan engine.

The thrust augmenter is normally located at the rear portion of a gas turbine engine. FIGS. 1 and 2 show a section of the upper half of a turbofan engine, the longitudinal axis of the engine being depicted by the line A—A. The Augmenter includes a generally annular augmenter casing 1, a generally annular forward liner 2 spaced radially inward from the casing 1, a generally annular mixer 3 spaced radially inward from the liner 2, and a diffuser cone 4 spaced radially inward from the mixer 3.

An annular cooling duct 5 is defined by the casing 1 and the liner 2. Relatively cool air from the fan bypass duct flows through the cooling duct and aids in maintaining the temperature of the casing and the components outside of it at an acceptable temperature.

A fan flow duct 6 is defined by the liner 2 and the mixer 3. Bypass air from the fan flows through this duct where it is mixed with fuel and ignited to provide additional engine thrust.

A core flow duct 7 is defined by the mixer 3 and the diffuser cone 4. Gas flows through the duct 7 after exiting the last stage of the turbine. This gas is mixed with fuel and ignited to provide additional engine thrust. The mixer 3 can be shaped downstream of the fuel injector such that the gas from both the fan flow duct 6 and the core flow duct 7 are mixed. An example of such a mixer shape is outlined in FIGS. 1 and 2.

The fuel injection system of this invention has a low profile. That is, the elements of the injection system extend radially only a minimum distance from the casing. Furthermore, as will be described hereinafter, elements of the injection system are secured with the augmenter casing, rather than being spaced apart from it. These factors permit the augmenter section of the engine to be of minimum radial dimensions and correspondingly permit a reduction in aircraft frontal area and drag. Although this invention is particularly adaptable to a turbofan engine, it is to be understood that it can also be successfully used on other types of gas turbine engines with equally beneficial results. For example, when used on a turbojet engine, such elements in the augmenter as the mixer 3 and the fan flow duct 6 will, of course, not be included. Furthermore, it must be kept in mind that certain elements of this invention to be described hereinafter, such as the fan fuel manifold, the fan injector valve heads, and the fan injector tubes, are only applicable when the invention is used on a turbofan engine. Other elements, on the other hand, such as the core fuel manifold, the core injector valve heads, and the core injector tubes, are equally applicable to turbojet and turbofan engines, as well as to other types of gas turbine engines.

The fan fuel manifold 10 and the core fuel manifold 11 carry fuel under pressure to the fuel injector assembly from a fuel source (not shown). The fan fuel manifold 10 and the core fuel manifold 11 are each brazed, welded, bonded or otherwise secured with or are integral with the casing 1. Both fuel manifolds preferably extend circumferentially around the outer surface of the casing 1.

This arrangement not only results in the desired low profile through minimum extension of the manifolds beyond the surface of the casing 1, but the manifolds also act as effective ring stiffeners for the casing, and thus eliminate or minimize the need for heavy and more costly casing stiffening devices.

As seen in FIGS. 1, 2 and 5, a plurality of low profile injector valve heads are spaced circumferentially around the outer surface of the casing 1. Fan injector valve heads 12 are spaced alternately with core injector valve heads 13, as shown in FIG. 5. Each of the injector valve heads 12 and 13 includes fuel metering means, shown schematically as 12a and 13a, for regulating the amount of fuel which is injected into the augmenter. An example of such means is a spring loaded metering valve. The injector valve heads receive fuel from the fuel manifolds 10 or 11 and in conjunction with the fuel metering means disperse it into the fan flow duct 6 or the core flow duct 7 in a manner to be described shortly.

As shown in FIGS. 1 and 2, the injector valve heads 12 and 13 preferably are each mounted on an injector mounting pad 14. A gasket 15 is used between each injector valve head and its mounting pad to prevent fuel leakage. The mounting pads 14 are brazed, welded, bonded, or otherwise secured with or are integral with the casing 1 to provide a very rigid mounting base for the injector tubes. As shown in FIG. 3, the injector valve heads 12 and 13 are secured to the mounting pads 14 and the casing 1 by appropriate means, such as by bolts 16 extending through flanges 17 of the injector valve heads. Thus, installation or replacement of the injector valve heads or the injector tubes extending from them requires only the simple operation of removing the bolts 16.

The fuel flows from the fuel manifolds 10 and 11 to the fuel valve heads 12 and 13, respectively, through a plurality of fuel conduits, or fuel connecting members, one fuel connecting member being associated with each injector valve head. Providing communication from the fan fuel manifold 10 to each fan injector valve head 12 is a fan fuel connecting member 20. Providing communication from the core fuel manifold 11 to each core injector valve head 13 is a core fuel connecting member 21. The fuel connecting members 20 and 21 are of relatively small dimensions radially so as to produce little aerodynamic drag within the cooling duct 5. As seen in the embodiment of FIGS. 1, 2, 3 and 4, each fan fuel connecting member 20 is a one-piece member and preferably includes three fan flow channels 20a, 20b, and 20c. Each core fuel connecting member 21 is a one-piece member and preferably includes one core flow channel 21a and two fan flow channels 21b and 21c. The number of fan core flow channels in the fan and core connecting members can, of course, be varied as desired. Each fuel connecting member is brazed, welded, bonded, or otherwise secured with or is integral with the inner surface of the casing 1. One end of the fan flow channel 20a of the fan fuel connecting member 20 is aligned with an opening 22 through the fan fuel manifold 10 and the casing 1 such that fuel from the manifold can freely flow into the fan flow channel 20a. Likewise, one end of the core flow channel 21a of the core fuel connecting member 21 is aligned with an opening 23 through the core fuel manifold 11 and the casing 1 such that fuel from that manifold can flow freely into the core flow channel 21a.

The other end of the fan flow channel 20a is aligned with an opening 24 through the casing 1 and mounting pad 14 such that fuel can freely flow through the fan flow channel 20a and into the fan injector valve head 12. Likewise, the other end of the core flow channel 21a is aligned with an opening 25 through the casing 1 and mounting pad 14 such that fuel can freely flow through the core flow channel 12a and into the core injector valve head 13.

At least one fan injector tube 30 extends from each fan injector valve head 12 into the fan flow duct 6. At least one core injector tube 31 extends from each core injector valve head 13 into the core flow duct 7.

Because of the geometrical relation between the fan flow duct 6 and core flow duct 7 in the embodiment shown, there are twice as many fan injector tubes as core injector tubes to enable proper fuel distribution to obtain the desired thrust augmentation. According to one embodiment of the present invention, the additional required fan injector tubes 32 extend from each core injector valve head 13 to reduce the number of injector valve heads required, and correspondingly their weight and cost. Thus, both core and fan injector tubes 31 and 32 extend from the core injector valve heads 13, while only fan injector tubes 30 extend from the fan injector valve heads 12.

The number of injector tubes extending from the injector valve heads is determined primarily by performance considerations. For example, better radial fuel distribution, and therefore better performance, can be achieved if two or more injector tubes are used, each injecting fuel at a different annular zone within the fan and core flow ducts and each tube separately metered within the valve head. Two fan injector tubes 30 extending from each fan injector valve head 12 and two core and two fan injector tubes 31 and 32 extending from each core injector valve head 13 are shown in FIGS. 1 and 2 and have been found suitable. However, the number of injector tubes can be varied if desired, depending on the requirements of fuel distribution, uniformity and resultant efficiency.

To eliminate the need for separate fuel metering means within each core injector valve head 13, one for the core injector tubes and one for the fan injector tubes extending from it, the fuel for the fan injector tubes 32 is metered by metering means within adjacent fan injector valve heads 12. The metering means within each core injector valve head 13 meters only the fuel for the core injector tubes 31 extending from it. Thus, the metering means within each fan injector valve head 12 meters not only fuel for the fan injector tubes extending from it but also fuel for fan injector tubes extending from adjacent core injector valve heads.

To accomplish this transfer of metered fuel from a fan injector valve head 12 to a fan injector tube extending from an adjacent core injector valve head 13, an arrangement of fuel jumper tubes 33 is utilized. Each fuel jumper tube 33 is located external to the outer surface of the casing 1. The jumper tubes so located create no aerodynamic drag as they would, for example, if mounted within the cooling duct 5. As seen in FIG. 3, one end of the fuel jumper tube 33 communicates through the casing 1 with a fan flow channel 20b of the fan fuel connecting member 20. The other end of the fuel jumper tube communicates through the casing 1 with a fan flow channel 21c of an adjacent core fuel connecting member 21. The fan flow channel 21c also communicates directly with a fan injector tube 32. Thus, metered fuel flows from a fan injector valve head 12, through a fan flow channel 20b, a fuel jumper tube 33, a fan flow channel 21c, and into a fan injector tube 32.

In the arrangement shown in FIG. 3, each fan injector valve head 12 supplies metered fuel to a fan injector tube 32 extending from both adjacent core injector valve heads 13. That is, each of the fan injector tubes 32 extending from a single core injector valve head 13 receives its metered fuel from a separate fan injector valve head. This provides separate fuel metering for the two fan injector tubes and consequently better radial fuel distribution. In an alternative arrangement of the jumper tubes 33 (not shown), both fan injector tubes 32 extending from a single core injector valve head 13 are supplied with metered fuel from a single fan injector valve head 12. This simpler arrangement would find use where radial fuel distribution is less critical.

Each injector tube 30, 31, and 32 includes a plurality of spray orifices 34 through which fuel flowing through the injector tubes is injected into the gas flowing through the fan flow duct 6 and the core flow duct 7. The number and the locations of the spray orifices 34 along the injector tubes can be varied as desired. In the arrangement of spray orifices 34 shown in FIGS. 1 and 2, for example, all of the spray orifices included in one of the two fan injector tubes and in one of the two core injector tubes are radially inward from all of the spray orifices included in the other of the fan and core injector tubes. This permits one injector tube of the pairs of injector tubes 30, 31 and 32 to inject fuel into the radially outer portions of the fan and core flow ducts 6 and 7 while the other injector tube of the pair injects fuel into the radially inward portions of the ducts. When this arrangement of spray orifices 34 is utilized, the inner end of each injector tube 30 and 31 is adjacent the radially innermost spray orifice. Thus, the injector tubes 30 and 31 which contain orifices for injecting fuel into the radially outward portions of the fan and core flow ducts 6 and 7 terminate at approximately the centers of the ducts. However, other arrangements of spray orifices 34 as well as varying numbers and lengths of injector tubes can be effectively used in this invention.

The injector tubes 30, 31, and 32 extend generally radially inward from the injector valve heads 12 and 13. The injector tubes preferably comprise a generally coplanar bundle in which they are aligned substantially parallel to and adjacent each other in a plane parallel to the longitudinal axis of the engine so as to present the least surface area to the flow of gas through the fan flow duct 6 and the core flow duct 7.

In the embodiment of FIGS. 1 and 2, fillet radii 35 are added adjacent each injector mounting pad 14 and between the injector tubes. The purpose of the fillet radii is to minimize stresses at the joint between the injector tubes and the injector valve head. Such stresses can occur, for example, when the injector tubes are flexed due to aerodynamic drag loading or flow excited vibration. The fillet radii 34 reduce the stress at the critical attachment point of the injector tubes.

A bushing 36 preferably surrounds each bundle of injector tubes at a point where the tubes extend through an opening in the forward liner 2. The functions of the bushing are to add structural rigidity to the bundle of injector tubes and to prevent fuel, ejected from the spray tubes, from seeping through the opening in the forward liner 2 and into the cooling duct 5. A flange assembly 37 holds a floating seal 38 which is added at the bushing 36 to facilitate assembly and alignment of the injector tubes and to further control fuel seepage. The sides of the bushing 36 abut the floating seal 38.

The bundles of injector tubes extending from the core injector valve heads 13 preferably include a second bushing 40 which surrounds the bundle at the inner ends of the fan injector tubes 32 where the core injector tubes pass through an opening in the mixer 3 into the core flow duct 7. The function of this bushing 40 is to prevent chafing between the core injector tubes 31 and the mixer 3, as well as to provide structural support for the bundle. Both bushings 36 and 40 are preferably oval in shape, although other shapes can be utilized if desired.

In FIG. 1, a reinforcing beam 41 is shown added to each of the bundles of injector tubes which extend from a core injector valve head 13 and is located adjacent the core injector tubes 31 and radially inward from the ends of the fan injector tubes 32. The bushing 40 also surrounds the outer end of the reinforcing beam 41. The reinforcing beam provides additional strength to the bundle of injector tubes in the portion of the bundle which is exposed to the very high core gas temperatures.

To prevent vibration of the bundles of injector tubes which extend from the core injector valve heads, an annular damper ring 42 preferably engages each bundle, including the reinforcing beam 41, intermediate the inner end of the bundle and the mixer 3. In the configuration shown in FIGS. 1 and 5, the damper ring 42 includes openings through which each bundle extends. The damper ring preferably is supported solely by the bundles.

The elements of this invention can be made of any suitable material capable of withstanding the high temperature produced within and around the augmenter. For example, the fuel manifolds, injector valve heads, injector tubes, and jumper tubes can be made of a titanium alloy. In addition, although elements of the invention have been described in the embodiments as being secured with the casing, it should be recognized that such elements can be made to be integral with the casing, for example, through sheet metal fabrication, casting, etc. It is intended to include such arrangements within the definition of "secured with".

It is to be understood that this invention is not limited to the particular embodiment disclosed, and it is intended to cover all modifications coming within the true spirit and scope of this invention as claimed.

What is claimed is:

1. In a gas turbine engine having a thrust augmenter including a casing, a low profile fuel injection system for the augmenter comprising:
    (a) at least one fuel manifold on the outer surface of the casing for receiving fuel under pressure from a fuel source and communicating through said casing with at least one fuel conduit on the inner surface of said casing; and
    (b) at least one injector valve head on the outer surface of said casing communicating with said fuel conduit through said casing and with at least one injector tube having spray orifices and extending from said injector valve head through said casing into the interior thereof.

2. The fuel injection system of claim 1, wherein said casing is generally annular and said fuel injection system includes a plurality of said injector valve heads spaced circumferentially on the outer surface of said casing.

3. The fuel injection system of claim 2, wherein said fuel manifold extends circumferentially on and is secured with the outer surface of said casing.

4. The fuel injection system of claim 1, wherein said injector valve head includes fuel metering means.

5. The fuel injection system of claim 1, wherein each said fuel conduit comprises at least one flow channel in a fuel connecting member secured with the inner surface of said casing.

6. The fuel injection system of claim 1, wherein each said injector valve head is mounted on a mounting pad bonded to the outer surface of said casing.

7. In a gas turbine engine having a thrust augmenter including a generally annular casing, a generally annular forward liner spaced radially inward from said casing, an annular cooling duct between said casing and said liner, and a core flow duct within said liner, a low profile fuel injection system for the augmenter comprising:
    (a) at least one fuel manifold extending circumferentially on and secured with the outer surface of the augmenter casing for receiving fuel under pressure from a fuel source and communicating through said casing with a plurality of flow channels in fuel members secured with the inner surface of said casing; and (b) a plurality of injector valve heads including fuel metering means spaced circumferentially and mounted on the outer surface of said casing, each said injector valve head communicating with at least one of said flow channels through said casing and with at least one injector tube having a plurality of spray orifices and extending generally radially from said injector valve head through said casing and an opening in the forward liner into the core flow duct.

8. The fuel injection system of claim 7, further comprising a bushing surrounding each said injector tube in each said opening of said forward liner.

9. The fuel injection system of claim 7, further comprising an annular damper ring within said core flow duct joined to said injector tubes.

10. In a turbofan engine having a thrust augmenter including a generally annular casing, a generally annular forward liner spaced radially inward from said casing, a generally annular mixer spaced radially inward from said liner, an annular cooling duct between said casing and said liner, an annular fan flow duct between said liner and said mixer, and a core flow duct within said mixer, a low profile fuel injection system for the augmenter comprising:

(a) a fan fuel manifold extending circumferentially on and secured with the outer surface of the augmenter casing for receiving fuel under pressure from a fuel source, and communicating through said casing with a plurality of fan flow channels in fan fuel connecting members secured with the inner surface of said casing;

(b) a plurality of fan injector valve heads including fuel metering means spaced circumferentially and mounted on the outer surface of said casing, each said fan injector valve head communicating through said casing with:
(i) at least one of said fan flow channels;
(ii) at least one fan injector tube having a plurality of spray orifices and extending generally radially from said fan injector valve head through an opening in the forward liner into the fan flow duct; and
(iii) at least one additional fan flow channel in said fan fuel connecting member, each said additional fan flow channel communicating through said casing with a fuel jumper tube extending external to the surface of said casing to an adjacent core injector valve head;

(c) a core fuel manifold extending circumferentially on and secured with the outer surface of said casing, for receiving fuel under pressure from a fuel source and communicating through said casing with a plurality of core flow channels in core fuel connecting members secured with the inner surface of said casing; and (d) a plurality of core injector valve heads, including fuel metering means spaced circumferentially and mounted on the outer surface of said casing alternately with said fan injector valve heads, each said core injector valve head communicating through said casing with at least one of said core flow channels and with at least one core injector tube having a plurality of spray orifices and extending generally radially from said core injector valve head through openings in said forward liner and the mixer into the core flow duct, each said core injector valve head further including at least one fan injector tube, having a plurality of spray orifices and extending generally radially through an opening in said forward liner into said fan flow duct from said core injector valve head, each said fan injector tube extending from said core injector valve head and communicating therein with an additional fan flow channel in said core fuel connecting member, each said additional fan flow channel in said core fuel connecting member communicating through said casing with said fuel jumper tube.

11. The fuel injection system of claim 10, wherein each said fan injector valve head communicates therein with two fan injector tubes, each said core injector valve head communicates therein with two core injector tubes and includes two fan injector tubes extending therefrom, each said fan fuel connecting member includes two said additional fan flow channels therein, and each said core fuel connecting member includes two said additional fan flow channels therein.

12. The fuel injection system of claim 10, wherein said fan and core injector tubes comprise generally coplanar bundles aligned parallel to the direction of gas flow through the augmenter.

13. The fuel injection system of claim 12, wherein each said bundle extending from said core injector valve head includes a reinforcing beam adjacent said core injector tubes and located radially inward of the ends of said fan injector tubes.

14. The fuel injection system of claim 10, wherein each said fan and core injector valve head is mounted on a mounting pad secured with the outer surface of said casing.

15. The fuel injection system of claim 14, wherein said mounting pad includes a gasket between its outer surface and said injector valve head.

16. The fuel injection system of claim 12, wherein said bundles include fillet radii adjacent the inner surface of said casing.

17. The fuel injection system of claim 11, wherein all of said spray orifices included in one of said two fan injector tubes and in one of said two core injector tubes are radially inward from all of said spray orifices included in the other of said two fan and core injector tubes.

18. The fuel injection system of claim 10, further comprising an annular damper ring within said core flow duct and joined to said core injector tubes.

* * * * *